D. D. JACKSON.
PROCESS FOR THE RECOVERY OF POTASH FROM CEMENT MIXTURES.
APPLICATION FILED JUNE 29, 1920.
1,415,572.
Patented May 9, 1922.
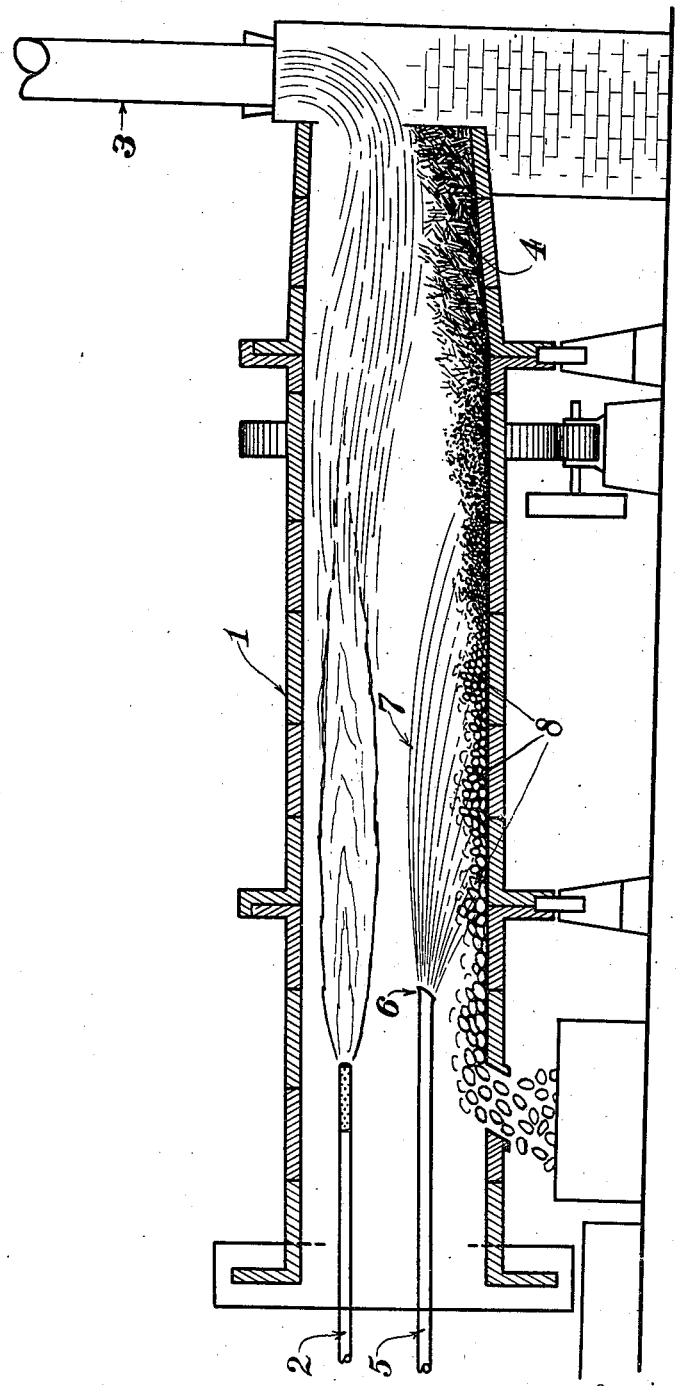
Inventor
Daniel D Jackson,
By Kenyon & Kenyon,
his Attorneys

UNITED STATES PATENT OFFICE.

DANIEL D. JACKSON, OF BROOKLYN, NEW YORK.

PROCESS FOR THE RECOVERY OF POTASH FROM CEMENT MIXTURES.

1,415,572. Specification of Letters Patent. Patented May 9, 1922.

Application filed June 29, 1920. Serial No. 392,619.

*To all whom it may concern:*

Be it known that I, DANIEL D. JACKSON, a citizen of the United States, and a resident of Brooklyn, in the county of Kings and State of New York, have invented a new and useful Improvement in Processes for the Recovery of Potash from Cement Mixtures, of which the following is a specification.

My improvement relates to processes for the recovery of potash from cement mixtures. It has for its object to increase the amount of potash recovered from such mixtures, to simplify and cheapen and improve upon the processes heretofore in use for the recovery of potash from such mixtures, and also to avoid injurious effects upon the cement produced. It consists of the new and improved process hereinafter set forth.

Heretofore attempts have been made in the manufacture of cement to recover, during the process of making the cement, the potassium that existed in insoluble form in the cement mixtures subjected to the process, by introducing sulphurous fumes to form sulphates of potassium, or by the addition of chlorides such as sodium chloride to the cement mixtures. I have discovered that by introducing water vapor into the cement kiln during the process of making the cement, preferably by spraying water on to the hot clinker before it leaves the kiln, the oxide of potassium which is not volatilized to any extent under the usual temperature conditions prevailing in a cement kiln, is changed into the form of hydroxide which is rapidly volatilized under such temperature conditions, and in this way that it is possible to extract nearly all of the potassium that existed in insoluble forms in the cement mixtures placed in the kiln.

In the drawing accompanying this specification and forming part hereof, I have illustrated parts of an apparatus adapted to carry out my process in its preferred form.

In my process I take any ordinary cement mixture used for making cement, and add water vapor during the process of making the cement. The water vapor may be introduced into the kiln in any suitable way in the form of steam with the fuel, or by leading steam into the lower end of the kiln, or in any other suitable way. In practice, however, I prefer to introduce it by spraying water on to the hot clinker before it leaves the kiln, as illustrated in the drawing. In this way a sufficient supply of water vapor is obtained in a continuous manner and at the most advantageous point in the kiln, and I am therefore enabled to recover substantially all of the potassium existing in the original cement mixture introduced into the kiln as illustrated in the drawing.

Referring to the drawing, 1 is any ordinary rotary kiln provided with any suitable means for rotating it. As these form no part of the invention they are not shown in detail and will not be further referred to. 2 is the usual supply of fuel; 3 the stack for the discharge of the fumes resulting from the combustion. 4 indicates the cement mixtures being treated. 5 is a pipe connecting with any suitable source of water under pressure, the discharge end 6 of which is arranged to spray water, as at 7, upon the cement mixtures. This spraying is preferably done toward the discharge end of the kiln so as to fall upon the hot clinkers as indicated at 8. By spraying the water continuously upon the hot clinkers the water is applied in the best manner, and can be supplied in sufficient quantities to change substantially all the potash constituent of such mixtures into hydroxide, in which form it is readily volatilizable and therefore recoverable.

The amount of potash recoverable may be increased by adding to the ordinary cement mixtures employed a natural compound rich in potassium, such as glauconite or green sand or other potash bearing silicates.

I am aware that it has been proposed in the recovery of potassium from cement mixtures to introduce sulphurous fumes to form sulphate of potassium, and in connection therewith to introduce water vapor, but I have found that the introduction of sulphurous fumes, and the formation of sulphates, is unnecessary, and that the presence of sulphates to any any great extent interferes with the process and reduces the amount of the recovery of potash, the sulphate of potash not being to any extent volatilizable at the temperatures employed in the manufacture of cement, although the presence of a small amount of sulphur or sulphates in the ordinary cement mixtures used in producing cement, is substantially negligible when my process is employed. When my process is employed chlorides are not needed, and in fact the addition of chloride, especially sodium chloride, to the cement mix, is detrimental to the cement produced unless thoroughly removed by volatilization. On the other hand, the water vapor introduced in my process is not injurious in any way to the finished cement but tends, on the contrary, to improve it.

It will be understood, of course, that the recovery of the potash from the fumes or gases discharged from the kiln can be effected in any well known manner.

What I claim as new and desire to secure by Letters Patent, is:

1. In the recovery of potash from cement mixtures containing potassium in insoluble form, the process of subjecting the cement mixtures in a kiln to such temperatures as are necessary to form them into cement, and introducing water vapor into the kiln during the operation to change the potash constituent of such mixture into the form of hydroxide and volatilize it.

2. In the recovery of potash from cement mixtures containing potassium in insoluble form, process of subjecting the cement mixtures in a kiln to such temperatures as are necessary to form them into cement, and spraying water upon the hot clinkers in the kiln before they leave the kiln, thereby producing sufficient water vapor to change the potash constituent of such mixtures into the form of hydroxide and cause its volatilization.

3. In the recovery of potash from cement mixtures containing potassium in insoluble form, the process of subjecting the cement mixtures in a kiln to such temperatures as are necessary to form them into cement, and spraying water continuously upon the clinkers toward the discharge end of the kiln, and in sufficient quantities to change substantially all the potash constituent of such mixtures into hydroxide and volatilize it.

In testimony whereof, I have signed my name to this specification.

DANIEL D. JACKSON.